(12) United States Patent
Perraud et al.

(10) Patent No.: US 6,250,442 B1
(45) Date of Patent: Jun. 26, 2001

(54) GROUND POWER SUPPLY FOR ELECTRIC VEHICLE WITH EARTH CONNECTION

(75) Inventors: Olivier Perraud, Le Chesnay; Stéphane Brunet; Bruno Morin, both of Paris, all of (FR)

(73) Assignee: Societe Generale de Techniques et d'Etudes, Cergy-Pontoise (FR)

( * ) Notice: Subject to any disclaimer, the term of this patent is extended or adjusted under 35 U.S.C. 154(b) by 0 days.

(21) Appl. No.: 09/214,184

(22) PCT Filed: Mar. 16, 1998

(86) PCT No.: PCT/FR98/00526

§ 371 Date: Aug. 16, 1999

§ 102(e) Date: Aug. 16, 1999

(87) PCT Pub. No.: WO98/49025

PCT Pub. Date: Nov. 5, 1998

(30) Foreign Application Priority Data

Apr. 30, 1997 (FR) .................................................. 97 05370

(51) Int. Cl.[7] .................................................. B60L 9/00
(52) U.S. Cl. ................. 191/6; 191/1 R; 191/14; 191/22 R; 191/23 R; 191/25; 191/48
(58) Field of Search .................. 191/1 R, 6, 14, 191/15, 19, 22 R, 23 R, 25, 33 R, 48; 180/2.1

(56) References Cited

U.S. PATENT DOCUMENTS

| | | | | |
|---|---|---|---|---|
| 4,185,561 | * | 1/1980 | Reymann | 104/153 |
| 4,476,947 | * | 10/1984 | Rynbrandt | 180/2.1 |
| 5,045,646 | * | 9/1991 | Musachio | 191/6 |
| 5,134,254 | * | 7/1992 | Musachio | 191/6 |
| 5,148,898 | * | 9/1992 | Musachio | 191/6 |
| 5,277,285 | * | 1/1994 | Musachio | 191/6 |

FOREIGN PATENT DOCUMENTS

| | | | | |
|---|---|---|---|---|
| 3048-730 | * | 7/1982 | (DE) | B60M/1/10 |
| 3048730 | * | 7/1982 | (DE) | 191/22 R |
| 9651483A1 | | 12/1997 | (EP) | B60M/1/10 |
| 0197811 | * | 10/1986 | (GB) | 191/22 R |
| 0761493A1 | * | 12/1997 | (GB) | B60M/1/10 |

* cited by examiner

*Primary Examiner*—Jesus D. Sotelo
*Assistant Examiner*—Frantz F. Jules
(74) *Attorney, Agent, or Firm*—McCormick, Paulding & Huber LLP

(57) ABSTRACT

The invention relates to a ground power supply device for electric vehicles (5), the device including power supply segments (52) insulated from each other and each having a length less than half the length of the footprint of the vehicle (5), and being adapted to apply a supply voltage to a segment (52) only when said segment (52) is within the footprint of the vehicle (5), the vehicle (5) having a power supply rubbing member (80), and the device being adapted to apply the supply voltage to two adjacent segments (52) when the rubbing member (80) is in simultaneous contact with the two segments (52) and to earth one of the two segments (52) a short time after said rubbing member (80) has left that segment (52).

22 Claims, 10 Drawing Sheets

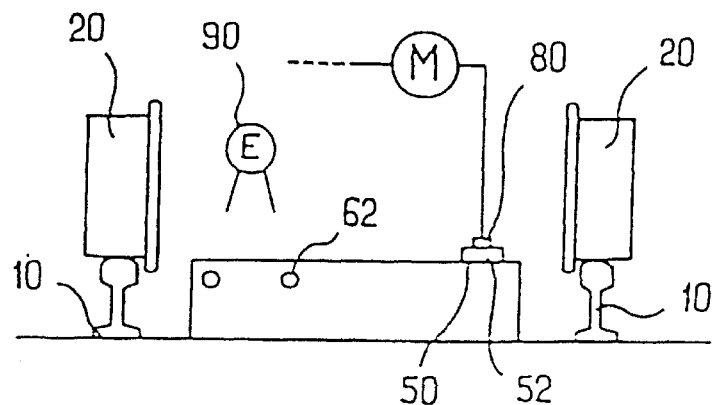
FIG_1
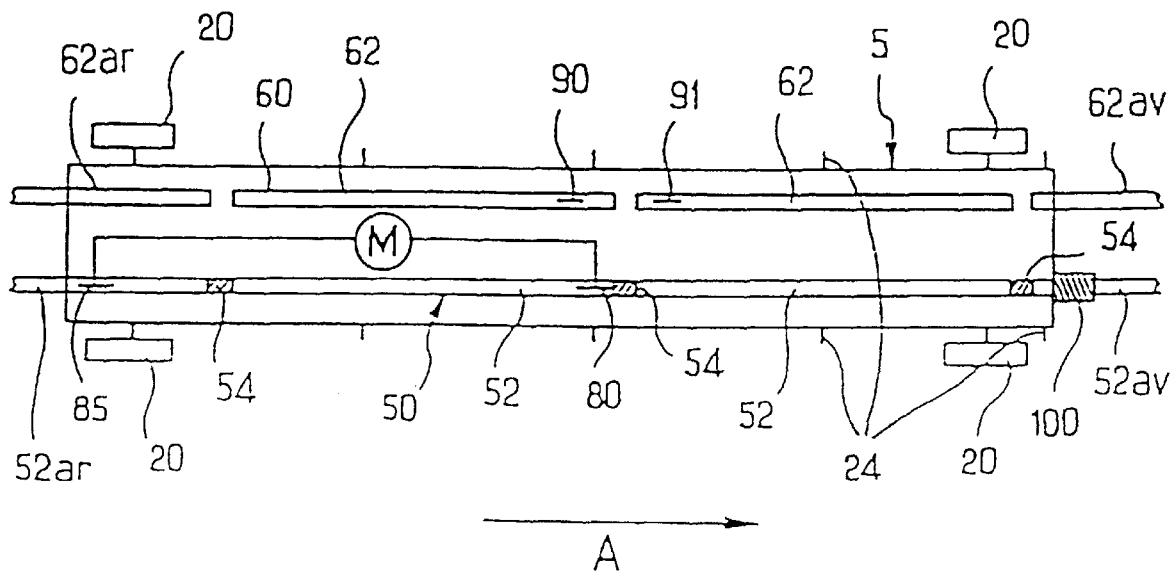
FIG_2

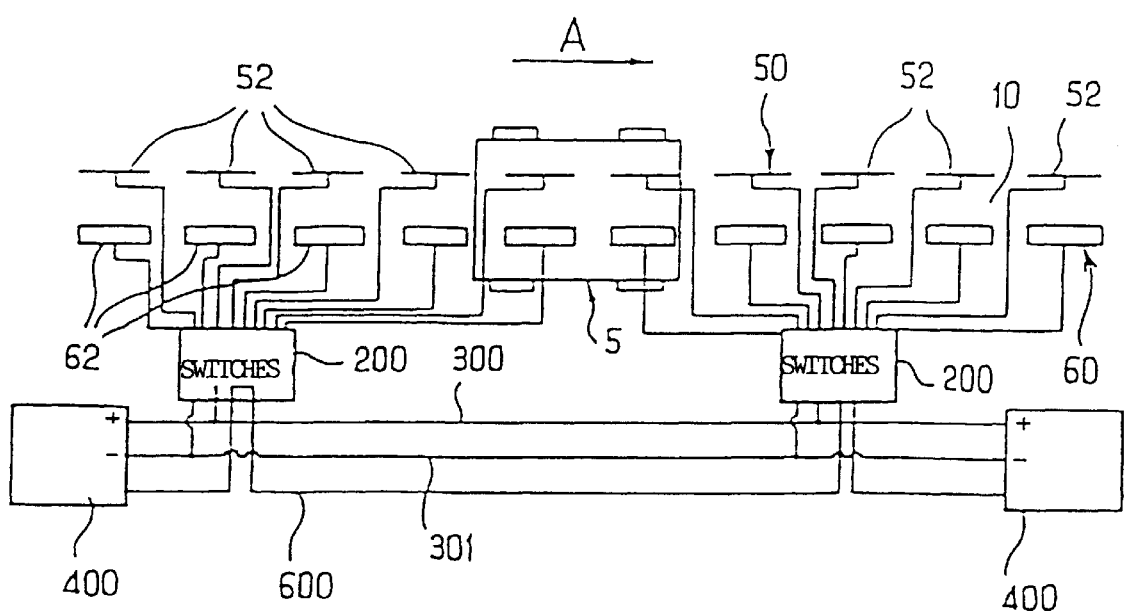
FIG_4

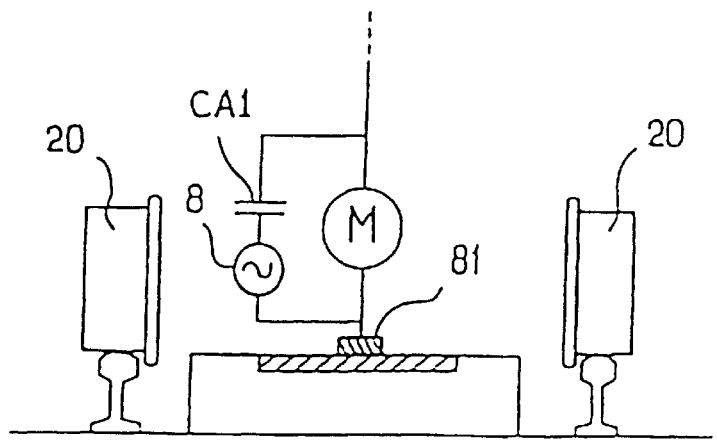
FIG_5
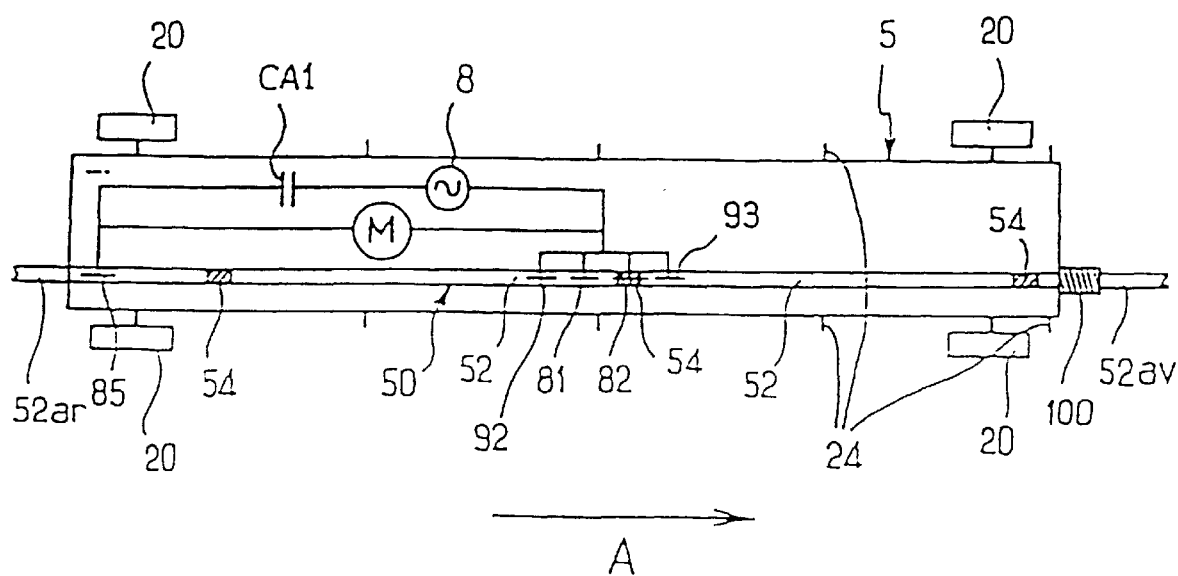
FIG_6

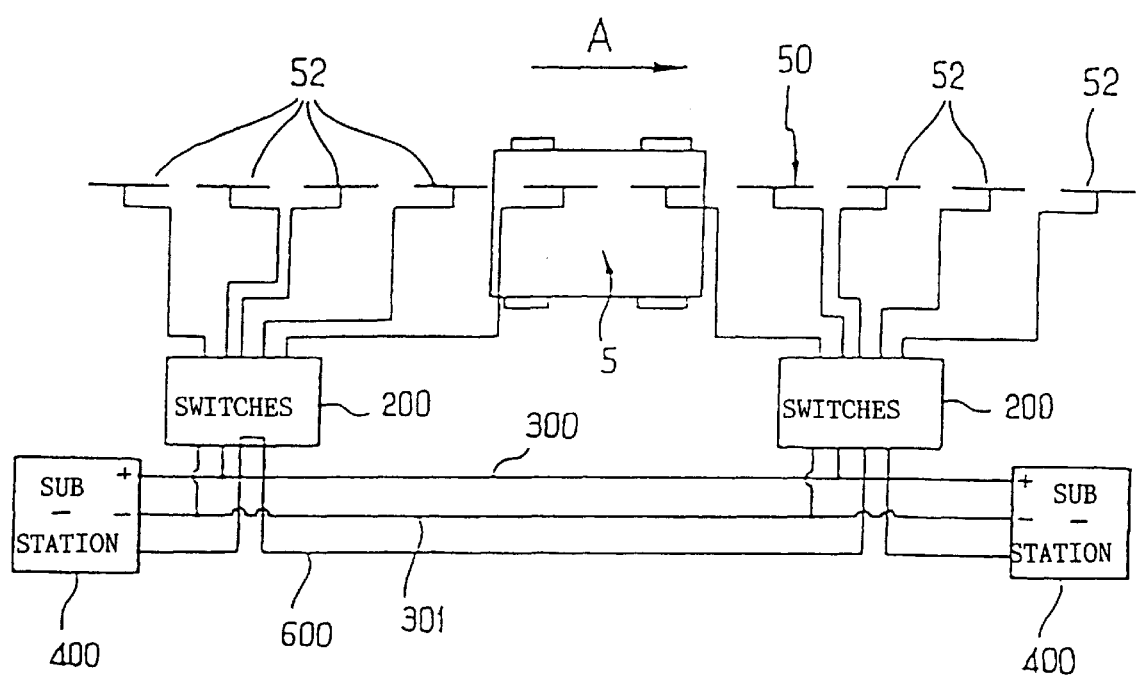
FIG_8

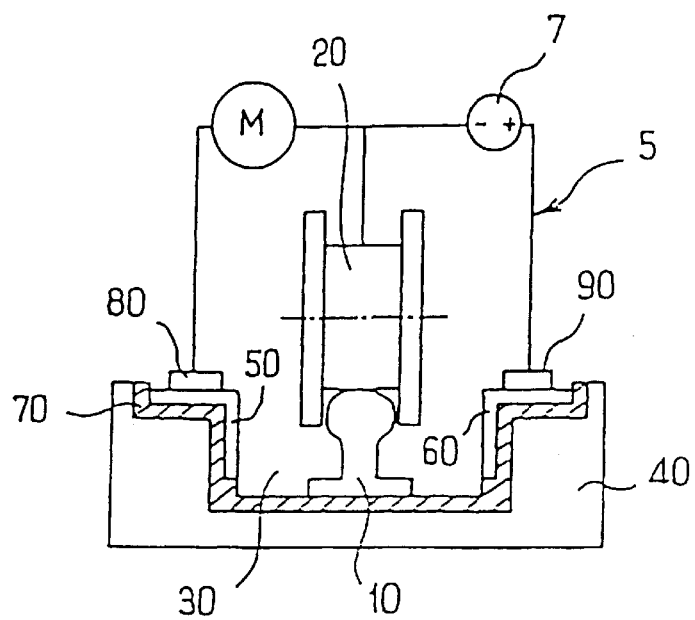
FIG_9
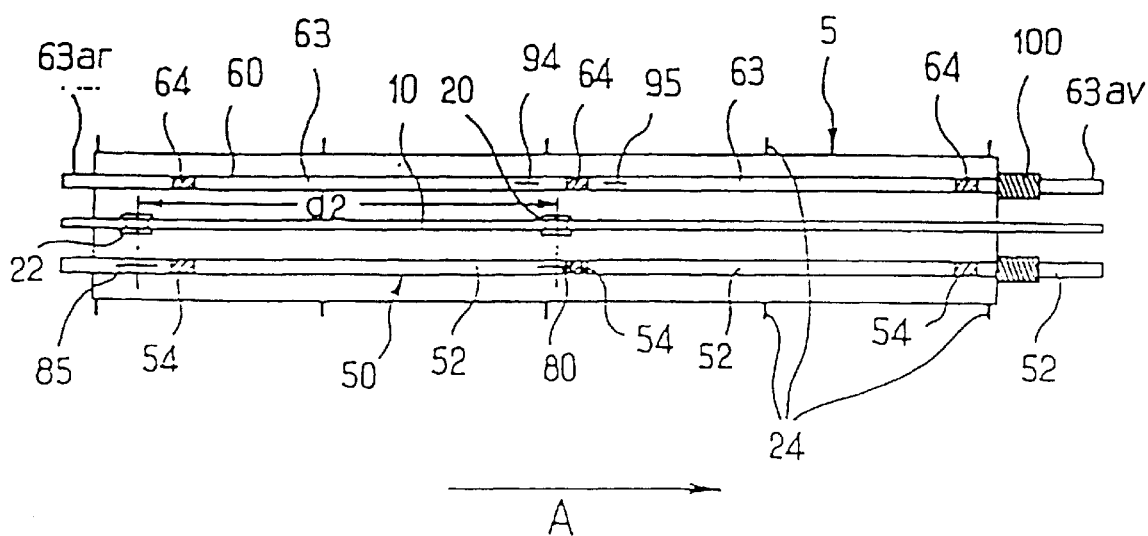
FIG_10

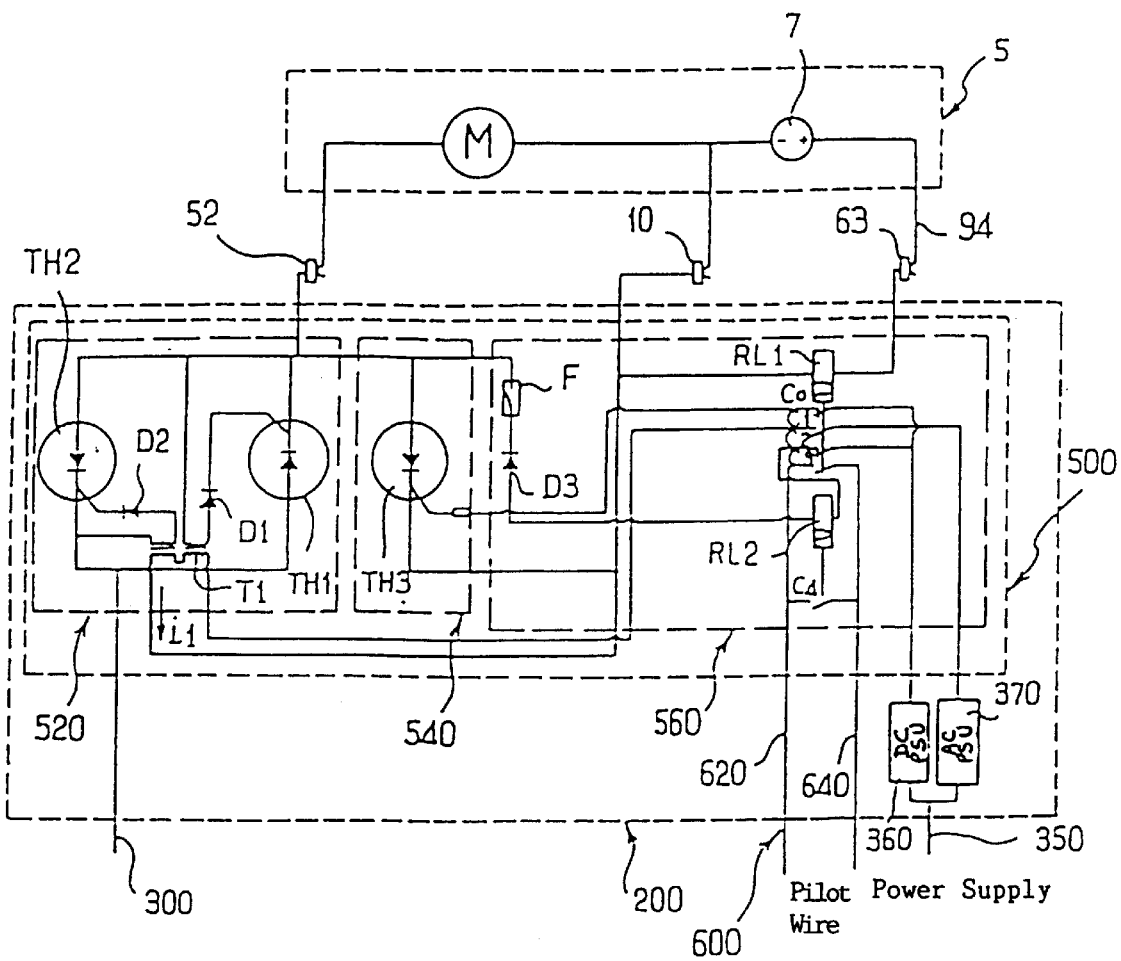
FIG_11
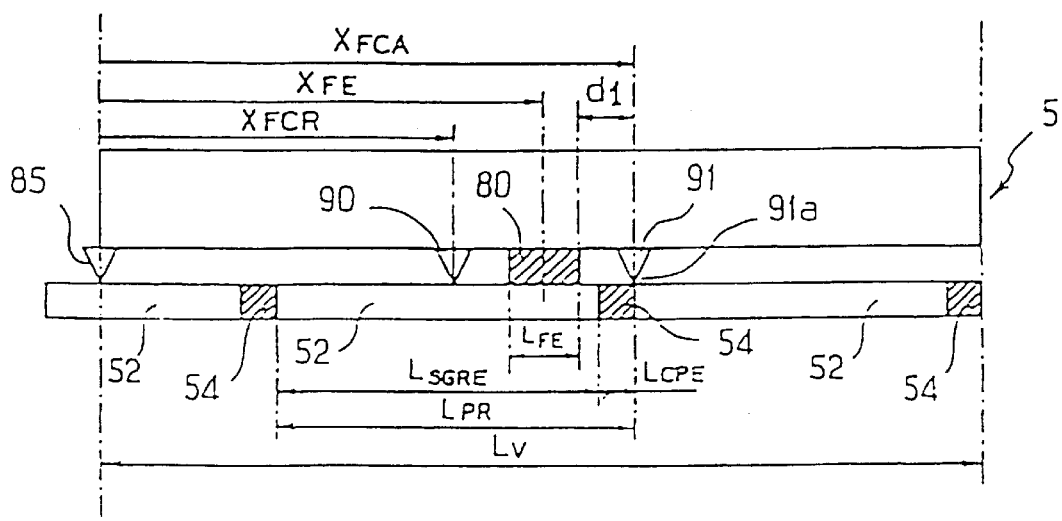
FIG_12

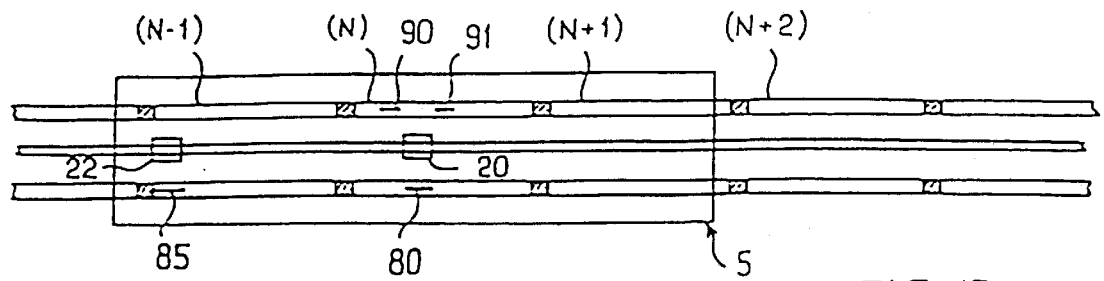
FIG_13a
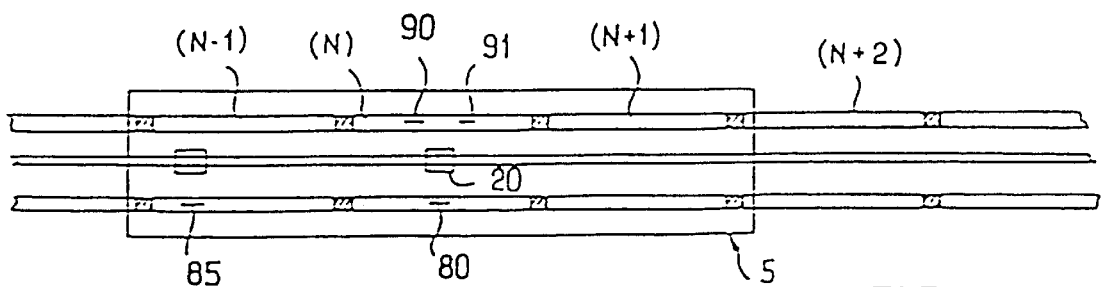
FIG_13b
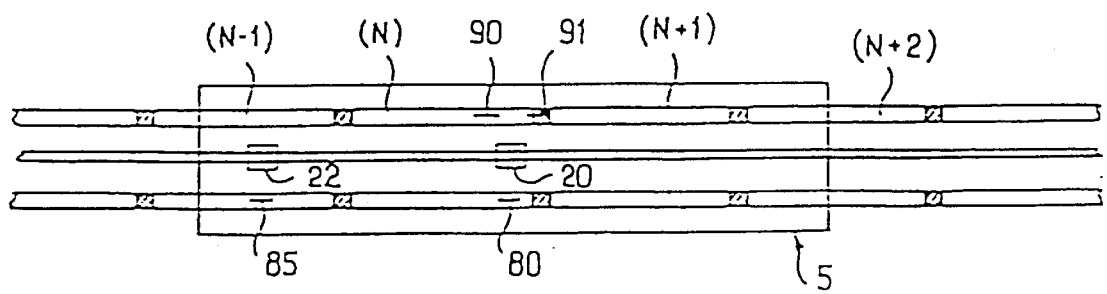
FIG_13c
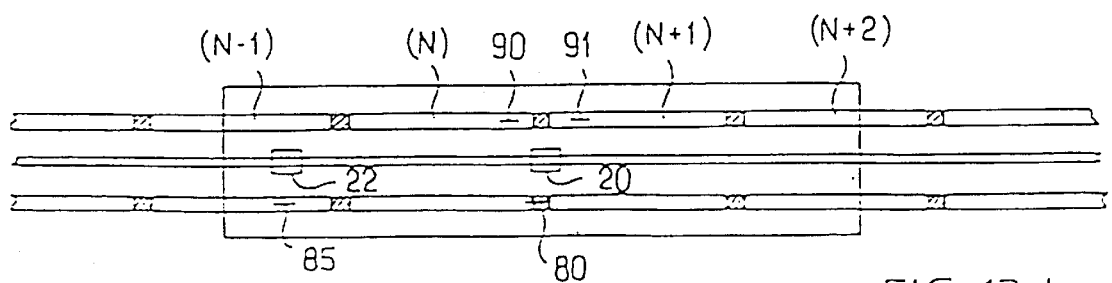
FIG_13d

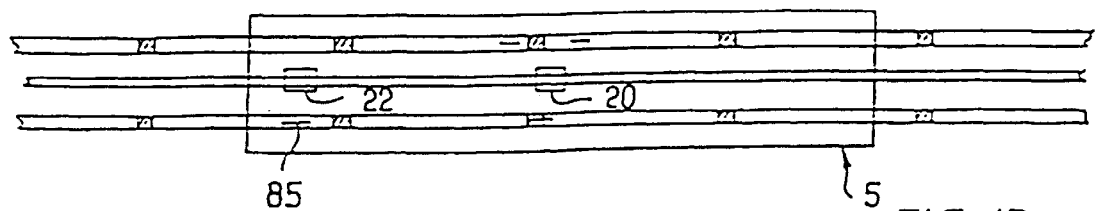
FIG_13e
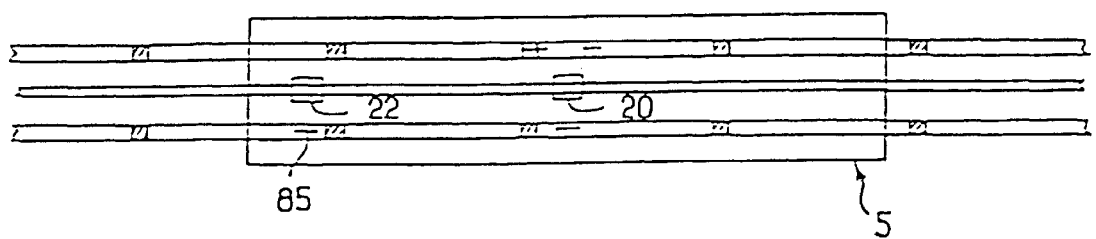
FIG_13f
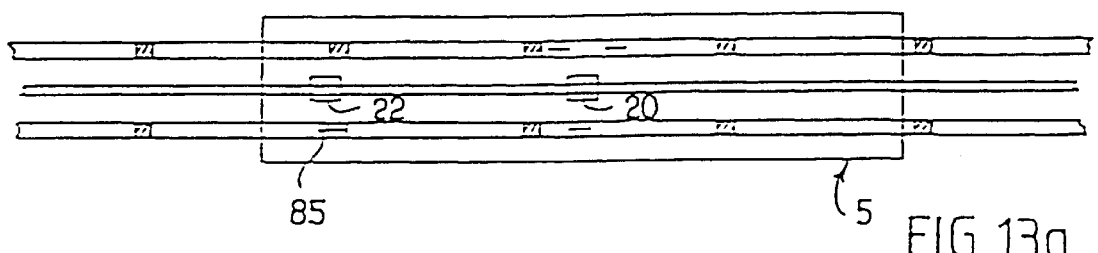
FIG_13g
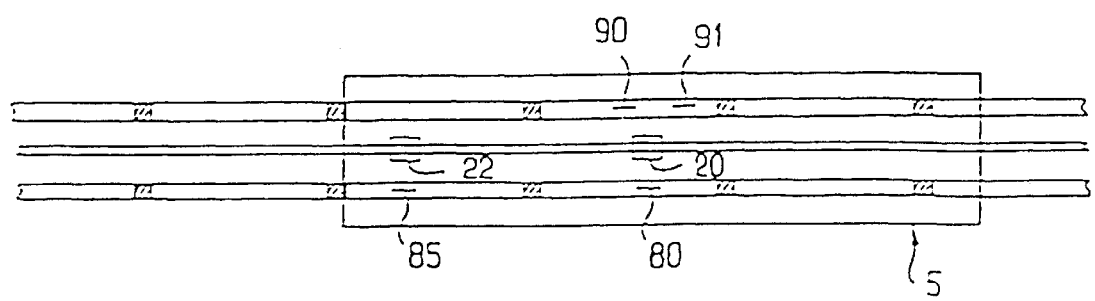
FIG_13h

GROUND POWER SUPPLY FOR ELECTRIC VEHICLE WITH EARTH CONNECTION

The invention concerns ground power supply devices for electric vehicles. It concerns rail vehicles and vehicles that are not guided by rails, for example electric private cars steered by a user or buses steered by a driver.

It is more particularly concerned with devices of the above kind in which a power supply track is made up of a sequence of segments electrically insulated from each other, and in which only the segments protected by the vehicle are live.

Electrified urban and intercity transport systems usually employ power supply devices including an overhead contact line. Overhead contact lines of the above kind are increasingly unacceptable in urban areas, in particular in historic towns, for aesthetic reasons.

Additionally, devices with overhead contact lines are not free of the risk of electrocuting pedestrians, in particular because of the risk of the contact line breaking.

German Patent DE 3 048 730 proposes a device in which a continuous live line forming a power supply busbar is disposed under a sectionalized rail laid on the ground on which pick-up shoes on the vehicle slide.

A terminal between each segment of the sectionalized rail and the continuous line is electrically connected to the continuous line which is offset downwards relative to the power supply rail when there is no vehicle in the segment concerned.

A magnetized bar under the vehicle attracts the terminal against the segment when the vehicle is above a given segment. The segment is then live by virtue of the electrical connection between the terminal and the live continuous line.

When the vehicle has passed, the terminal resumes its place set back from the power supply rail which is no longer live.

For safety reasons and to prevent short-circuits, the length of the power supply segments is such that only the segments covered by the vehicle are live.

The above device has a major drawback: although they are no longer live when the vehicle is not present, the segments can retain a high electrical charge.

Accordingly, when used in an urban environment, for example to supply power to a tram, there is a real risk of a device of the above kind electrocuting pedestrians.

Also, the device is designed for use with battery-powered vehicles and is ill-suited to use with high currents. Mechanical switches of the above kind require greater forces to separate them from the power supply segments if they carry high current, in which case this gives rise to highly undesirable electrical arcing. A device for biasing the terminals downwards able to exert forces of such magnitude would be costly and difficult to install in the relatively restricted space between the segments and the live continuous line.

Patent DE 4 329 935 proposes an electrical power supply device for electric vehicles of the battery powered car type.

In the above document the segments of a power supply track are longer than the vehicle. The segment over which the rear axle of the vehicle is located is live and the segment over which the front axle of the vehicle is located is earthed. The power supply current then passes between the rear axle and the front axle via the electric motor of the vehicle.

The above device has the major drawback that the live segment extends a great distance beyond the boundary of the vehicle.

The device therefore involves the risk of electrocuting pedestrians which makes it difficult to use anywhere that pedestrians may need to pass behind the vehicle.

Note that the earthing arrangements described in the above document could not applied to the system described in document DE 3 048 730 because the rail segment adjacent the live segment must be "floating", i.e. not earthed.

Also, the system described in DE 4 329 935 inevitably causes discontinuities in the supply of power, which is highly undesirable, especially in the case of vehicles energized with a high current.

An aim of the present invention is to alleviate the above drawbacks by proposing a sectionalized ground power supply device in which the power supply segments are entirely located under the vehicle and all segments that are not within the footprint of the vehicle are earthed.

Another aim of the invention is to propose a ground power supply device in which failure of any component never leads to a segment that is not covered by the vehicle becoming live.

The device is particularly suitable for supplying power to an urban rail vehicle on a public road, such as a tram, but also for a power supply network for private vehicles steered by their users.

In accordance with the invention the above aims are achieved by a ground power supply device for electrical vehicles including a power supply track made up of segments separated from each other by insulative joints and each having a length less than half the length of the footprint of the vehicle and a switching device adapted to apply a supply voltage to a segment only when said segment is within the footprint of the vehicle characterized in that the vehicle has power supply rubbing member means the extent of which is greater than the length of the insulative joints and in that the switching device is adapted to apply the supply voltage to two adjacent segments when the rubbing member means are in simultaneous contact with the two segments and to earth one of the two segments a short time after said rubbing member means have left that segment.

The device of the invention can optionally include one or more of the following advantageous features:

the vehicle carries a control device adapted to energize any segment at least a part of which is in an activation area whose ends are on respective opposite sides of and beyond front and rear edges of the rubbing member means of the vehicle;

the distance between the front end of said activation area and the front edge of the power supply rubbing member means is greater than the product of the maximum speed of the vehicle and a maximum segment switching time;

the control device comprises two presence signal generators which define said ends of said activation area;

the device includes a control receiving track made up of insulated segments having the same lengths and the same locations as the segments of the power supply track and the signal generators comprise two rubbing members connected to a voltage generator on board the vehicle in contact over a limited distance with said control track;

the control receiving track and the power supply track are combined and the voltage generator generates an AC voltage superimposed on a supply voltage;

the control device has at least one current loop on board the vehicle and the device includes a set of current loops disposed successively along the power supply track and each adapted to transmit an electrical control signal when a magnetic field passes through it, the onboard loop and the loops disposed along the track being adapted to produce local magnetic coupling when the onboard loop is in line with one of the loops disposed along the track;

the loops have the same lengths and the same locations as the segments of the power supply track and the vehicle carries two onboard current loops disposed on respective opposite sides of and beyond front and rear edges of the rubbing member means which define said ends of said activation area;

the device includes a current return track and the vehicle carries a safety rubbing member in contact with the power supply track and connected directly to the current return track disposed to the rear of the rear end of said activation area at a distance from that end greater than the length of a power supply segment plus the product of the maximum speed of the vehicle and a maximum segment switching time;

the vehicle carries a return rubbing member for the power supply current from the motor of the vehicle in is contact with the power supply track and disposed ahead of the front end of the activation area at a distance from that end greater than the length of a power supply segment;

the vehicle carries a return rubbing member for the power supply current from the motor of the vehicle in contact with the power supply track and disposed to the rear of the rear end of said activation area at a distance from that end greater than the length of a power supply segment plus the product of the maximum speed of the vehicle and a maximum power supply segment switching time;

the device comprises a switching module for each power supply segment which receives an input voltage when a control segment or a control loop corresponding to a power supply segment receives a signal indicating presence of the vehicle;

the switching module is adapted to connect the corresponding power supply segment selectively to earth or to a permanent voltage source;

each switching module includes a semiconductor power supply switching device conducting in the direction from the permanent voltage source to the power supply segment and a control input of which is connected to a permanent low-voltage source via a first switch controlled by a main relay energized by said input voltage;

each switching module includes a braking current semiconductor switching device conducting in the direction from the power supply segment to the permanent voltage source and a control input of which is connected to said permanent low-voltage source via said first switch;

the switching module includes an earthing semiconductor switching device conducting in the direction from the power supply segment to earth and a control input of which is connected to said permanent low-voltage source via a second switch controlled by said main relay;

the switching module includes a pilot wire which when cut trips out said permanent voltage source and the pilot wire includes in parallel:
a first pilot wire controlled by a secondary relay connected to said permanent low-voltage source via a third switch controlled by the main relay and connected to the power supply segment via a diode conducting in the direction towards the power supply segment, the first switch of the pilot wire being closed when the secondary relay is not energized, and
a second pilot wire switch controlled by the main relay and closed when the main relay is energized;

a fuse is connected in series with the diode of the secondary relay;

when the main relay is energized:
the first switch is closed;
the second switch is open;
the third switch is open; and
the second pilot wire switch is closed.

Other features, aims and advantages of the present invention will become apparent on reading the following detailed description given by way of non-limiting example only and with reference to the accompanying drawings in which:

FIG. 1 is a view transverse to the running direction of a system constituted by an electric vehicle, a power supply track, and an electromagnetic control loop in a first embodiment of the invention.

FIG. 2 is a plan view of the same system showing in schematic form the parts of the vehicle that are in contact with the tracks or that interact with the control loops.

FIG. 4 is a bottom view of a system comprising a power supply track, a set of electromagnetic loops and an electric vehicle conforming to the embodiment of the invention shown in FIGS. 1 to 3.

FIG. 5 is a view transverse to the direction of motion of an electric vehicle of a system constituting a second embodiment of the invention comprising the electric vehicle and a power supply track.

FIG. 6 is a plan view of the same system showing in schematic form the parts of the vehicle that are in contact with the track.

FIG. 8 is a bottom view of a system comprising a power supply track and an electric vehicle conforming to the embodiment of the invention shown in FIGS. 5 to 7.

FIG. 9 is a view transverse to the direction of motion of an electric vehicle of a system constituting a third embodiment of the invention comprising the electric vehicle, a power supply track, a control track and a guide rail.

FIG. 10 is a bottom view of the same system showing in schematic form the parts of the vehicle that are in contact with the tracks.

FIG. 11 is an electronic circuit diagram of a switching module conforming to the embodiment shown in FIGS. 9 and 10.

FIG. 12 is a side view of a power supply rail in accordance with the invention showing various characteristic spacings between various component parts of a device in accordance with the invention.

FIGS. 13a through 13h are each a plan view of a system comprising power supply and control tracks and an electric vehicle at successive stages of the progress of the vehicle along the tracks.

FIG. 1 is a transverse view of the region adjoining a power supply track 50 for a guided electric vehicle 5 which here is the motor unit of a tram.

Figure 3:
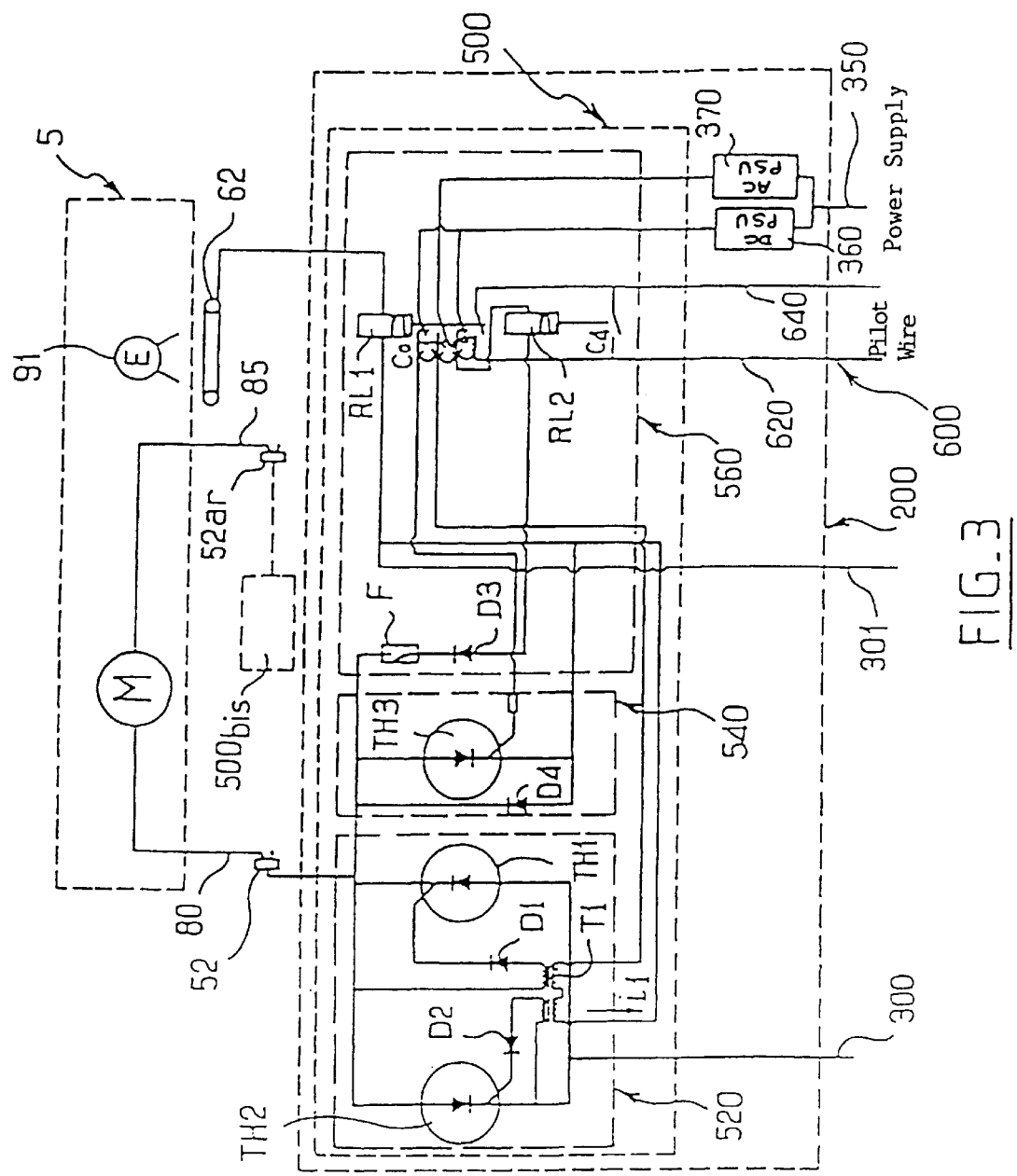
FIG. 3 is an electronic circuit diagram of a switching module from the embodiment shown in FIGS. 1 and 2.

Top surfaces of two rails 10 receive supporting wheels 20 of vehicle S.

Rails 10 are disposed in grooves in the roadway the width of which is significantly greater than that of rail 10 and the depth of which is substantially the same as the height of rail 10 so that the top of the rail is flush with the top of the grooves.

Power supply track 50 is between and parallel to rails 10. Track 50 can be thin because it serves only to conduct electricity and has no mechanical function.

Track 50 can be narrow in the non-limiting embodiment described here where the vehicle is a rail vehicle. Nevertheless, the device described hereinafter can easily be adapted to provide a power supply installation for private vehicles steered by a user. In this case power supply track 50 is preferably wide enough to allow lateral excursions of the vehicle without breaking contact between the vehicle and track 50. In one embodiment rubbing members are used which are wide enough to remain in contact with the power supply track despite any such excursions.

Power supply 50 supplies voltage to a motor M of the vehicle. A first terminal of motor M is connected to a power supply rubbing member 80 attached to the vehicle and adapted to slide on the top face of power supply rail 50.

As shown in FIG. 2, power supply rail 50 is made up of a series of segments 52 of constant length disposed end to end and separated by insulative joints 54.

The second terminal of motor M, not shown in FIG. 1, is connected to a rubbing shoe 85 at the rear of the vehicle, the shoe being in contact with power supply track 50 to provide the current return as explained below.

The device shown in FIGS. 1 to 4 also includes a set of a conductive loops 62 buried in the ground between the two rails 10. Each loop 62 extends parallel to rails 10 and has a width perpendicular to rails 10 substantially equal to one quarter of the distance between the two rails 10.

The system comprising rails 10, loops 62 and power supply track 50 is mounted in a concrete base.

Loops 62 are arranged end to end along rails 10. To be more precise, each loop 62 has a length parallel to rails 10 equal to the length of segments 52 of power supply track 50 and the loops are disposed so that the distance between two adjacent ends of two consecutive loops is substantially equal to the length of an insulative joint 54.

To be more precise, loops 62 are arranged along the rails in the same fashion as segments 52 of conductive track 50, the ends of loops 62 being at the same locations along the rails as the ends of segments 52.

Vehicle 5 carries two magnetic signal senders 90 and 91 disposed so that each emits a field propagating towards the ground under the vehicle in a limited area under the vehicle.

The senders preferably each include a current loop, the current loops carrying a current generated on board the vehicle.

To be more precise, in a preferred embodiment of the invention senders 90 and 91 are disposed under the vehicle, facing loop 62, and each emits a field that extends along the vehicle a distance that is negligible compared to the length of loops 62.

FIG. 2 shows the senders from above as rectangles the length of which corresponds to the extent of the magnetic field emitted by the sender concerned.

Senders 90 and 91 are in the form of loops carrying an alternating current and they therefore emit an alternating magnetic field.

In one embodiment of the invention senders 90 and 91 are electromagnetic field senders.

FIG. 2 shows the disposition of senders 90 and 91. In FIG. 2 the footprint of the vehicle is represented by a rectangle 5, the front and the rear of the vehicle being defined relative to the direction of motion indicated by an arrow A.

As described in more detail below, when one of (emitting continuously) senders 90, 91 is in line with a loop 62 power supply segment 52 co-located with that loop is live at a DC voltage of 750 volts.

The two senders 90 and 91 therefore respectively define the rear and front ends of an activation area such that any segment 52 any part of which is inside that area is live at the power supply voltage.

The length of power supply rubbing member 80 parallel to the direction of movement of the vehicle is advantageously greater than the length of insulative joints 54. In this way when power supply rubbing member 80 leaves one power supply segment 52 it is already in contact with the next segment 52, which is already energized, as explained below.

This assures uninterrupted supply of power to the vehicle, the transition from one segment 52 to the next being progressive and avoiding disruptive discharge and electrical arcing.

The insulation can also be bridged in the above manner by replacing long rubbing member 80 with two localized rubbing members located at positions corresponding to respective ends of long rubbing member 80, for example, and electrically connected to each other. In this case the two rubbing members advantageously have a length less than the length of insulative joints 54 between power supply segments 52.

Front and rear senders 91 and 90 are respectively offset to the front and to the rear of power supply rubbing member 80 so that when power supply rubbing member 80 reaches a joint 54, as shown in FIG. 2, front control sender 91 is already over the next loop 62 (so that the next segment 52 of the power supply rail is energized) while rear control sender 90 continues to emit via the previous loop 62 so that the previous segment 52 is still live at the power supply voltage. The previous segment remains live at least until power supply rubbing member 80 has actually left it.

The switching time of a power supply segment is defined as the time between first reception via a loop 62 of a magnetic field emitted by a sender 90 or 91 and application of 750 V DC to the power supply segment 52 connected to that loop 62.

To be more precise, distance d1 between the front edge of power supply rubbing member 80 and front edge 91a of the field emitted by front sender 91 must be greater than the power supply segment switching time multiplied by the maximum speed of the vehicle.

This assures that for any speed of the vehicle when power supply rubbing member 80 comes into contact with a power supply segment the latter is already at 750 volts.

FIG. 2 shows two control loops 62 completely and parts of two other loops, namely a loop 62av at the front and a loop 62ar at the rear.

As explained in more detail below, a segment 52 whose corresponding loop 62 is not receiving a control magnetic field emitted by one of senders 90 or 91 is not energized and is instead connected to earth or more generally to a current return line.

The vehicle has a rear rubbing member 85 in contact with power supply rail 50. Rear rubbing member 85 is connected to a terminal of electric motor M opposite the first terminal connected to shoe 80.

The distance between the front edge of rear rubbing member 85 and the rear edge of rear control sender 90 is greater than the length of a power supply segment so that rear rubbing member 85 is never in contact with a segment 52 which is live. Rubbing member 85 is therefore earthed at all times regardless of the position of the vehicle.

One terminal of motor M is therefore connected to an energized segment 52 and the other terminal is connected to an earthed segment 52ar.

The vehicle also carries a cleaning device 100 at its front end which clears water or detritus from power supply rail 50. This device is a blower, for example.

FIG. 4 is a general block diagram of the power supply device in accordance with the present invention.

The segments 52 are individually connected to switching cabinets 200.

To be more precise, each switching cabinet is connected separately to a series of (for example five) consecutive segments 52 and to a power supply line 300 laid alongside the track.

Power supply line 300 is divided into line portions with their ends connected to substations 400 in a conventional manner. A safety pilot wire 600 runs between two substations 400 and passes through each switching cabinet 200, together with a current return line 301 that is preferably earthed but which can equally be connected to a negative potential in substations 400.

Each switching cabinet 200 contains (for example) five switching modules each connected to a given control loop 62 and an associated power supply segment 52 alongside it.

FIG. 3 shows an electric circuit corresponding to the preferred embodiment of a switching module of the above kind.

To be more precise, FIG. 3 shows a switching cabinet in which only one switching module is shown together with the connections from the switching module to a power supply segment 52 and the corresponding control loop 62.

Switching module 500 and switching cabinet 200 are symbolized by dashed line rectangles.

Its connections to power supply segment 52 and control loop 62 are shown in the top part of module 500 in FIG. 3.

In the bottom part of the figure the module is connected to power supply line 300 and to current return line 301 which is advantageously connected to earth. It is also connected to a 220 V AC power supply line 350 via a DC power supply 360 and an AC power supply 370.

Also shown is pilot wire 600 which has two branches, to be more precise an entry branch 620 into the module and an exit branch 640 out of the module.

In this embodiment the pilot wire is double-switched (four branches) by adding a contact to relay RL1 and to relay RL2, the pilot wire forming a second loop with two switches in parallel each disposed under one of the additional switches. Double switching of the pilot wire limits the risk of a current detector on the pilot wire for tripping a circuit-breaker device registering a current due (for example) to accidental earthing of the pilot wire when the latter is cut.

Switching module 500 comprises three subsystems each having its own specific function.

The three subsystems are: a power supply system that connects a power switch 520 between power supply segment 52 and 750 V power supply line 300; an earthing power switch system 540 between power supply segment 52 and a current return line 301; a system 560 controlling systems 520 and 540 and providing a general circuit-breaker function.

The general circuit-breaker function opens pilot wire 600 which disconnects power supply line 300 using means known in themselves, not shown in FIG. 3 and incorporated into the substation 400 shown in FIG. 4.

Power supply switch system 520 includes a semiconductor power supply switching device TH1 conducting in the direction from power supply line 300 to power supply segment 52.

The trigger of thyristor TH1 is connected to its cathode via a secondary winding of LS transformer T1 connected in series with a diode D1 conducting in the direction from the winding to the trigger of the thyristor.

An energy recovery thyristor TH2 in parallel with thyristor TH1 conducts in the direction from power supply segment 52 to power supply line 300.

Figure 7:
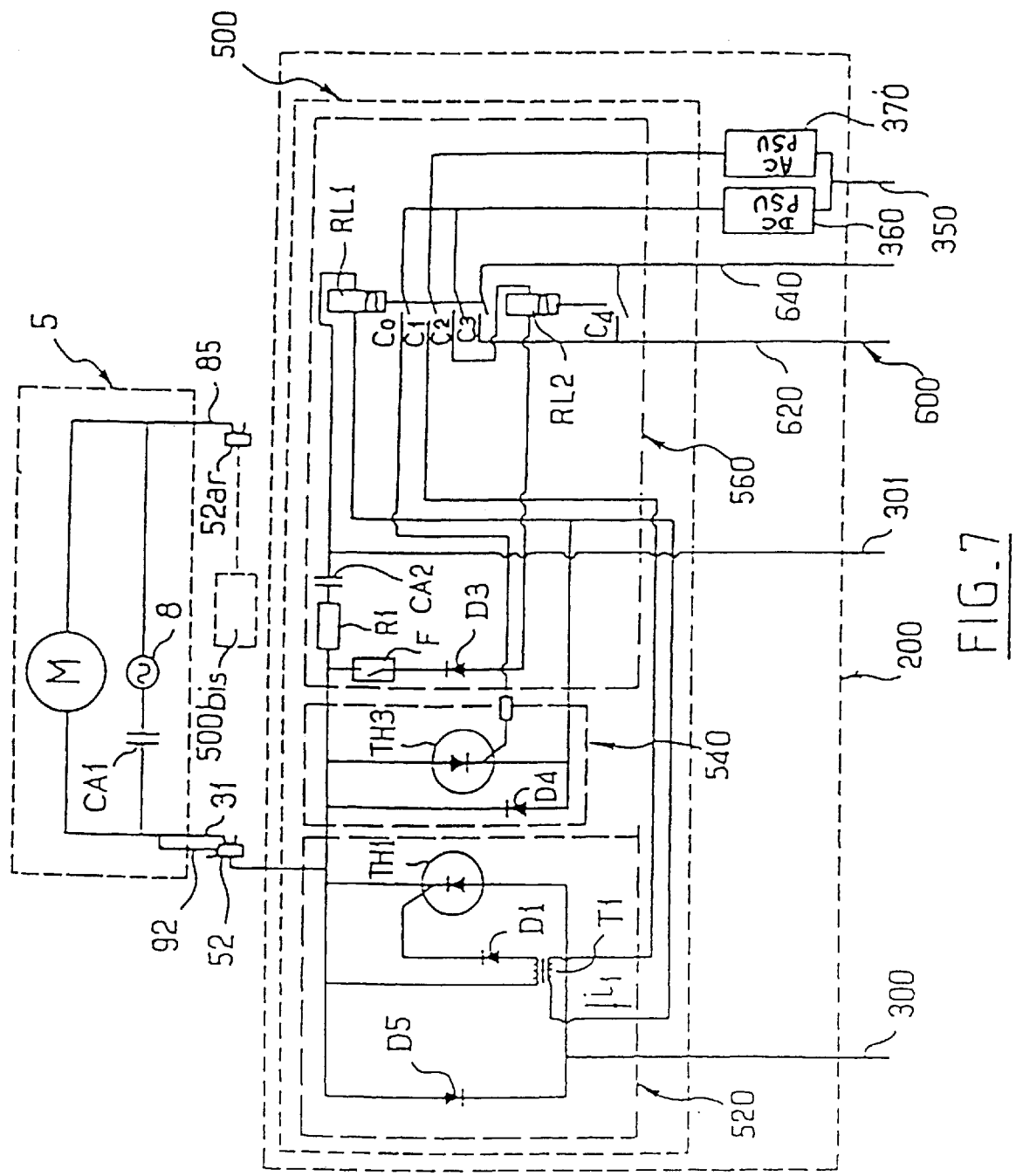
FIG. 7 is an electronic circuit diagram of a switching module conforming to the embodiment shown in FIGS. 5 and 6.

It can be replaced by a diode D5 conducting in the direction from segment 52 to power supply line 300, as shown in FIG. 7.

The trigger of thyristor TH2 is connected to its cathode via a second secondary winding of transformer T1 in series with a diode D2 conducting in the direction from the winding to the trigger of thyristor TH2.

Transformer T1 therefore has a single primary winding and two secondary windings.

For each of thyristors TH1 and TH2, when an alternating current is flowing in the primary winding of transformer T1 an AC voltage is obtained across the two secondary windings of transformer T1.

Diodes D1 and D2 then produce a unidirectional current in the secondary windings of transformer T1.

Thyristors TH1 and TH2 are then turned on.

System 520 therefore constitutes a switch between power supply 300 and segment 52 controlled by an input alternating current passing through a contact C1 (see below).

Earth switch system 540 includes a thyristor TH3 conducting in the direction from power supply segment 52 to current return line 301.

In the case of current return via a current return line 301 (also known as a feeder), a diode D4 is advantageously connected in parallel with thyristor TH3 to conduct in the direction from return feeder 301 to power supply rail 52.

When a braking current is flowing from the motor of the vehicle to power supply line 300 via terminal 81 and thyristor TH2 it reaches a segment 52ar that is not energized at an opposite terminal 85 of the motor. The current then flows through a module 500 to which segment 52ar is connected via diode D4, thyristor TH1 being turned off in segment 52ar.

Segment 52 cannot be at a voltage higher than that of current return feeder 301 when the trigger of thyristor TH3 receives a direct current. The segment is then at zero potential when line 301 is connected to earth.

Control system 560 comprises two relays RL1 and RL2.

The coil of relay RL1 is connected between control loop 62 and return line 301.

Relay RL1 has four contacts C0, C1, C2, C3.

Contact C0 connects the output of direct current generator 360 selectively to the trigger of earthing thyristor TH3.

Contact C1 connects the output of alternating current generator 370 selectively to a terminal of the primary winding of transformer T1, the other terminal of that primary winding being connected to earth.

Relay RL1 is an AC relay.

Contacts C0 and C1 are such that when relay RL1 is energized by an AC voltage generated by an alternating magnetic field sent to loop 62 by sender 91, contact C0 is open and contact C1 is closed with the result that power supply segment 52 is connected to power supply line 300 and earthing thyristor TH3 is turned off.

Conversely, if there is no magnetic field through loop 62 contact C0 is closed and contact C1 is open with the result that segment 52 is earthed and the connection between power supply segment 52 and power supply line 300 is cut.

A subsystem of control system 560 including contacts C2, C3, relay RL2 and the portion of pilot wire 600 inside switching module 500 will now be described.

The role of this subsystem is to cut pilot wire 600 in response to a malfunction of earthing thyristor TH3 or direct current generator 360.

Pilot wire 600 splits into two parallel branches inside switching module 500; each branch carries one contact. The contacts are respectively contact C3 of relay RL1 and a single contact C4 of relay RL2.

The control input of relay RL2 is connected to direct current generator 360 by contact C2 controlled by relay RL1.

The two pilot wire switches C3 and C4 are such that when relay RL1 is energized contact C3 is closed and when relay RL2 is energized contact C4 closes so that at least one of relays RL1 and R2 must be energized for the pilot wire not to be cut.

The control circuit of relay RL2 leaves the output of direct current generator 360 and returns to a terminal connecting the module to power supply segment 52.

Between the above two points it includes in series contact C2, the coil of relay RL2, a diode D3 connected in the conducting direction and a fuse F.

Relay RL2 is energized only if contact C2 is closed and thyristor TH3 is turned on, i.e. the power supply segment is earthed.

Contact C3 is open when relay RL1 is not energized.

Normal operation of control system 560 is as follows:

If no sender of the vehicle is over loop 62 relay RL1 is not energized. Contact C0 is then closed and earthing thyristor TH3 turned on; contact C1 is open and so power supply thyristor TH1 and recovery thyristor TH2 are turned off.

Contact C2 is closed. Because thyristor TH3 is turned on, relay RL2 is energized and contact C4 is therefore closed and so the pilot wire is conducting. Contact C3 is open.

When a vehicle is transmitting an AC voltage to relay RL1 via sender 91 or sender 90 and loop 62 contacts C0 and C1 are respectively open and closed and so power supply segment 52 is at a voltage of 750 volts via thyristor TH1 and a power supply current can flow in power supply line 300 to segment 52 via thyristor TH1. A braking current can flow in the opposite direction via thyristor TH2. Contacts C2 and C3 are respectively open and closed.

Relay RL2 is then not energized.

The pilot wire is continuous because contact C3 is closed and contact C4 is open.

The dynamic operation of the system will now be described. When vehicle 5 arrives front control sender 91 begins to apply AC voltage to the coil of relay RL1 via loop 62.

Contact C0 is then open, enabling de-energization and turning off earthing thyristor TH3.

Closing contact C1 applies AC voltage to transformer T1. Thyristors TH1 and TH2 are then turned on, supplying traction power to the vehicle via TH1 or recovering braking energy via TH2 after a time-delay due to transformer T1 enabling complete de-energization of thyristor TH3.

When the vehicle has moved forward enough for power supply rubbing member 80 to leave power supply rail segment 52 (with rear control sender 90 still aligned with loop 62) there is no traction current and no braking current flowing through thyristors TH1 and TH2, respectively, and so thyristors TH1 and TH2 can be de-energized. Vehicle 5 continues to move forward, rear control sender 90 leaves loop 62 and this causes relay RL1 to change state and open contact C1. Contact C0 is closed, which turns on earthing thyristor TH3 after an appropriate time-delay allowing complete de-energization of thyristors TH1 and TH2.

When the relay changes state the closing of contact C2 energizes the coil of relay RL2 and closes contact C4 to assure continuity of pilot wire 600 (contact C3 is open).

Because of the mode of operation of module 500 and the disposition of the various rubbing members and senders, rubbing member 80 is permanently in contact with a live power supply segment and rear rubbing member 85 is permanently in contact with a segment 52*ar* connected to a module 500 bis similar to that which has just been described and which connects segment 52*ar* to current return line 301, which is advantageously earthed.

There follows a detailed description of how the circuit described hereinabove handles a number of anomalies (degraded modes) to guarantee that the installation is safe under all circumstances.

The circuit firstly prevents any accidental energization of a power supply rail segment 52 when there is no vehicle present transmitting an alternating magnetic field to control loop 62.

This can occur in the event of breakdown of thyristors TH1 and TH2 or if a loop 62 is poorly insulated from an adjoining loop at which there is an alternating magnetic field. A short-circuit current then flows through thyristor TH3.

The adjoining substations 400 are then normally tripped out.

If in this situation thyristor TH3 fails and is stuck on relay RL2 is not energized which opens contact C4. Contact C3 is also open because there is no control voltage at the terminals of relay RL1. The pilot wire is therefore cut and so adjoining substations 400 also trip out in this case.

Another possible fault is breakdown of diode D3 so that it conducts in both directions. In this case, when power supply segment 52 is energized there is a short-circuit between the output of direct current generator 360, which is at 24 volts, and power supply segment 52, which is at 750 volts.

This blows fuse F and opens contact C4 of relay RL2.

When the vehicle moves away relay RL1 changes state and contacts C3 and C4 are then open. The pilot wire is cut and the adjoining substations trip out.

Relays RL1 and RL2 are preferably safety relays approved for applications involving danger of death, similar to those used in rail signaling. They are guaranteed to go to a specified fail safe configuration in the event of a fault.

Failure of either relay therefore opens the contact on the pilot wire controlled by that relay. Accordingly, the pilot wire is cut as soon as the relay in question fails and its non-operated state cannot lead to any incident other than tripping out of the adjoining substations.

Also, if low-voltage direct current power supply 360 fails relay RL2 is not energized when no vehicle is present, contact C4 remains open and pilot wire 600 is therefore cut as soon as contact C3 opens.

If alternating current power supply 370 fails transformer T1 is no longer energized, there is no current at the trigger of power supply thyristor TH1 or recovery thyristor TH2 and power supply segment 52 is therefore no longer energized.

Finally, any discontinuity in the part of the circuit connecting power supply segment 52 to earth causes relay RL2 to drop out, cutting the pilot wire and tripping out the adjoining substations as soon as the vehicle leaves the segment.

The final residual hazard is defective insulation between the tramway and the power supply segment when the vehicle is passing. To this end the vehicle can be equipped with earth braids at the perimeter of its footprint.

Of course, all components are chosen for maximum reliability.

In a second embodiment of the invention shown in FIGS. 5 through 8 the function of loops 62, i.e. reception of a signal generated on board the vehicle and its transmission to a switching control system, is assured by power supply rail 50 itself.

In these figures components identical or similar to those of the device previously described are designated by the same reference symbols and will not be described again.

In this embodiment the vehicle has four rubbing members in contact with segments of a single power supply and control rail 50. Two rubbing members 81 and 82 collect electrical energy from a high-voltage power supply line and two other rubbing members 92 and 93 transmit a control voltage from vehicle 5 to a control system 560 of switching module 500.

In one embodiment vehicle 5 has only a single long power supply rubbing member, as in the device from FIGS. 1 to 4. In another embodiment the vehicle has only one rubbing member constituting both a control rubbing member and a power supply rubbing member.

As shown in FIGS. 5 and 6, rubbing members 81, 82, 92 and 93 are electrically connected to each other directly and the vehicle includes in parallel with motor M an alternating current generator 8 connected in series with a capacitor CA1.

The electronic circuit of the FIG. 7 switching module 500 differs from that of FIG. 3 in that the terminal of relay RL1 that was previously connected to control loop 62 is now connected to power supply and control segment 52 via a capacitor CA2 and a limiter resistor R1.

The disposition of rubbing members 81, 82, 92, 93 and 85 is such that power supply rubbing members 81 and 82 are both in contact at all times with a live segment and current return rubbing member 85 is in contact at all times with an earthed segment 52.

The alternating current generated by generator 8 flows through rubbing member 92 or 93 (rubbing member 92 in the FIG. 7 example), resistor R1, capacitor CA2 and relay RL1. The alternating current generated by generator 8 has the same effect on relay RL1 as the AC voltage applied via loop 62 in the FIG. 3 embodiment. The AC voltage supplied by generator 8 is superimposed on the power supply voltage of segment 52 when the latter is energized, capacitor CA2 and resistor R1 passing only the AC signal to relay RL1 to protect the relay from the power supply voltage.

Current return from motor M is via rear rubbing member 85 in this example. Nevertheless, in accordance with the invention, a current return rail or track running along power supply rail 50 could be used, the vehicle including a current return rubbing member in permanent contact with the current return rail instead of rubbing member 85.

Likewise, in accordance with the invention control and power supply currents can flow through certain supporting wheels in contact with a supporting rail. In this case the other wheels in contact with the control and power supply rail are preferably surrounded with an insulative layer, or more generally insulated from the vehicle body, so as not to conduct any electrical current between the vehicle and the power supply rail.

In a third embodiment of the invention shown in FIGS. 9 to 11 the device is provided with a power supply track 50 like that of the first embodiment shown in FIGS. 1 to 4, a guide rail 10 connected to earth and providing the current return and a control track 60 parallel to power supply track 50 and made up of segments 63 the same length as segments 52 and co-located with them along the path of the vehicle.

Here the guide rail is a central rail under the vehicle between the lateral supporting wheels thereof, which are wheels with tires, for example.

In this embodiment vehicle 5 has two rubbing members 94 and 95 on respective opposite sides of power supply rubbing member 80 along the path of the vehicle and offset laterally relative to rubbing member 80 so as not to be in contact with control track 60 when rubbing member 80 is in contact with power supply rail 50.

In this embodiment a power supply segment 52 is live at the power supply voltage when a corresponding control segment 63 is fed an AC voltage from vehicle 5 through at least one of the two rubbing members 94 or 95.

Rubbing members 94 and 95 therefore have the same functions as senders 90 and 91 of the embodiment shown in FIGS. 1 to 4 and control segments 63 have the same functions as loops 62 of the device from FIGS. 1 to 4.

FIG. 11 is a block diagram of a switching module for a device of the above kind.

The diagram differs from the diagrams for the previous two embodiments in that vehicle motor M has a current return terminal connected to a continuous current return rail 10 rather than a segment 52*ar* of power supply rail 50 that is earthed. Likewise, the switching module is here earthed via rail 10.

Also, relay RL1 is here adapted to receive direct current via one of the two control rubbing members 94 or 95 (rubbing member 94 in the FIG. 11 example).

Vehicle 5 therefore carries a 24 V DC voltage generator for producing a potential difference between earthing rail 10 and control segment 63.

In this embodiment control rubbing members 94 and 95 are preferably at the same level relative to the direction of movement and relative to power supply rubbing member 80 as senders 90 and 91 of the first embodiment shown in FIGS. 1 to 4.

Of course, the invention provides a power supply device including a current return rail with a control device including conductive loops and magnetic senders or a device including a return rail and in which control is effected by an alternating current on the power supply rail or a device with current return via earthed power supply segments with a control device using a control rail separate from the power supply rail.

The invention encompasses any association of the arrangements described hereinabove.

In accordance with the invention a current return terminal of the motor is connected to current return rubbing members, one disposed in the same manner as the previously described rubbing member 85 and the other disposed ahead of the activation area at a distance from the forward end of that area greater than the length of a power supply segment.

Providing the vehicle with two return rubbing members limits the risk of interruption of the return current by breaking contact between a single rubbing member and the power supply line or by accidental failure to earth a rear rail.

One particular disposition of the various rubbing members and senders under the vehicle will now be described together with a geometry of the rail segments which, in combination, assure energization and earthing of the power supply segments under the intended conditions.

FIG. 12 therefore shows two power supply segments 52 insulated from each other by joints 54.

The figure also shows two control senders 90 and 91 and a power supply rubbing member 80 using the same reference numbers as for the version shown in FIGS. 1 to 4.

The figure shows a disposition of senders 90 and 91 relative to the position of power supply shoe 80 which is advantageous not only in the device from FIGS. 1 to 4 but also in the devices described with reference to FIGS. 5 to 11, with reference numbers 90 and 91 respectively replaced by reference numbers 92 and 93 or reference numbers 94 and 95.

The control rubbing members of the second and third embodiments have the same function as senders 90 and 91 of the first embodiment, namely energizing a segment 52 level with at least one of the rubbing members in the direction of motion.

Accordingly the geometry of the device shown in FIG. 12 can be used with advantage in any of the devices previously described.

Likewise, the FIG. 12 rubbing member 80 can be replaced by a set of two rubbing members disposed at the ends of rubbing member 80.

Accordingly the FIG. 12 diagram applies equally to a device with a combined control and power supply rail or a device having a control rail separate from the power supply rail or a device using control loops. It is assumed that the control rail segments or the conductive loops have the same geometry and are placed at the same levels as the segments of the power supply rail relative to the direction of motion.

In FIG. 12 the footprint of electric vehicle 5 is symbolized by a rectangle.

Power supply rubbing member 80 is also represented by a rectangle and control senders 90 and 91 and current return rubbing member 85 are shown by triangles.

Of course, no current rubbing member 85 is needed in a device with current return via a return rail or track parallel to the power supply track.

However, in this case, and in particular if the return line is connected to earth, rubbing member 85 can be a safety rubbing member connected electrically to the current return line connected to earth to guarantee a return to earth of any segment with which it is in contact.

Accordingly, if the switching system fails a segment accidentally connected to 750 V is earthed via rubbing member 85, which trips out the switching device of the segment in question (see below) without activating the general protection circuit-breakers (not shown) upstream of the 750 V supply.

More generally, in this case a second safety rubbing member is optionally but advantageously disposed ahead of the activation area at a distance from the front end thereof greater than the length of a power supply segment.

The point of contact between rubbing member 85 and power supply rail 50 is essentially a point contact. Likewise senders 90 and 91 have a magnetic effect localized to a loop 62. The point at which each of the above components is operative is the apex at the bottom of each of the triangles symbolizing the component.

In this figure vehicle 5 is shown on reaching an insulative joint 54.

As previously mentioned, front control sender 91 reaches the next segment in advance of power supply rubbing member 80 to assure that the next segment is energized before power supply rubbing member 80 reaches it.

Both segments 52 are entirely under vehicle 5 in FIG. 12 and are therefore live.

Referring to FIG. 12, characteristic distances and widths of the power supply device are defined relative to the dimensions of vehicle 5 and the disposition of the rubbing members under the vehicle:

| | |
|---|---|
| LSGRE | is the length of each segment 52 |
| LCPE | is the length of each insulative joint 54 |
| LFE | is the length of power supply rubbing member 80 |
| XFE | is the distance between the center of rubbing member 80 and rear rubbing member 85. |

Localized control senders 90 and 91 are at respective distances $X_{FCR}$ and $X_{FCA}$ from rear rubbing member 85.

LV is the length of the body of vehicle 5.

V is the maximum speed of the vehicle and $T_c$ the segment switching time.

To be more precise, $T_c$ is the maximum time between the appearance or the disappearance of a control emission in a control loop 62 and respectively the appearance or the disappearance of the power supply voltage on the corresponding power supply segment 52.

As previously mentioned, the length $L_{FF}$ of power supply rubbing member 80 is advantageously greater than the length $L_{CPF}$ of insulative joints 54. Power supply rubbing member 80 then exits a power supply segment 52 when it is already in contact with the next, previously energized segment.

This provides uninterrupted supply of power to the vehicle preventing disruptive breakdown and electrical arcing.

This bridging of the insulation can also be achieved by replacing long rubbing member 80 with two shorter rubbing members at the same locations as respective ends of long rubbing member 80.

It is important for the emission point of rear control sender 90 to be to the rear of the rear edge of power supply rubbing member 80 so that power supply rubbing member 80 has left a given segment 52 before rear control sender 90 has left the corresponding control loop and said given segment 52 has been earthed.

The control signal transmitted by a given loop 62 must have disappeared before rear rubbing member 85 comes into contact with the corresponding power supply segment 52, allowing for the segment switching times.

To this end rear control sender 90 is at a distance $X_{FCR}$ from rear rubbing member 85 greater than the length of a segment 52 plus the product of maximum vehicle speed V and switching time $T_c$.

Also, given that no live segment must project beyond the front of the vehicle, the distance (LV–$X_{FCA}$) between front control sender 91 and the front edge of vehicle 5 must be greater than the length of a segment 52.

Similarly, no live segment must project to the rear of the vehicle and so, allowing for the switching time and the same maximum vehicle speed, the distance between the rear end of the vehicle and rear control sender 90 must be greater than the length of a power supply segment 52 plus the product of maximum vehicle speed V and switching time $T_c$ (same condition as above).

FIGS. 13a, 13b, . . . , 13h, show various successive states of a power supply device conforming to that of FIGS. 9 to 11.

FIGS. 13a through 13h can easily be adapted to other embodiments of the invention, in particular with control rail 60 and supply rail 50 combined or with control rail 60 replaced by a set of loops 62 disposed end to end.

The steps corresponding to FIGS. 13a through 13h constitute a complete power supply segment change cycle complying with the above recommendations on the disposition of the components.

Four power supply and control segments (N−1), N, (N+1) and (N+2) are shown and for each of these the status indicated in the following tables is Y(yes)/N(no) if:

the power supply segment is protected by the vehicle, the power supply segment is earthed through contact with earthed rear safety rubbing member 85, the control segment is at the control voltage, i.e. in contact with a control rubbing member, the power supply segment is at the traction voltage, and the traction current is made, i.e. the power supply segment is in contact with power supply rubbing member 80.

In the initial state, shown in FIG. 9*a*:

| Segment | N − 1 | N | N + 1 | N + 2 |
|---|---|---|---|---|
| Protected by vehicle | Y | Y | N | N |
| Earthed by vehicle | Y | N | N | N |
| At control voltage | N | Y | N | N |
| At traction voltage | N | Y | N | N |
| Traction current made | N | Y | N | N |

When the front of the vehicle reaches segment (N+2), FIG. 9*b*:

| Segment | N − 1 | N | N + 1 | N + 2 |
|---|---|---|---|---|
| Protected by vehicle | Y | Y | Y | N |
| Earthed by vehicle | Y | N | N | N |
| At control voltage | N | Y | N | N |
| At traction voltage | N | Y | N | N |
| Traction current made | N | Y | N | N |

When the front control rubbing member 91 reaches segment (N+1), FIG. 9*c*:

| Segment | N − 1 | N | N + 1 | N + 2 |
|---|---|---|---|---|
| Protected by vehicle | Y | Y | Y | N |
| Earthed by vehicle | Y | N | N | N |
| At control voltage | N | Y | Y | N |
| At traction voltage | N | Y | Y | N |
| Traction current made | N | Y | N | N |

When power supply rubbing member 80 reaches segment (N+1), FIG. 9*d*:

| Segment | N − 1 | N | N + 1 | N + 2 |
|---|---|---|---|---|
| Protected by vehicle | Y | Y | Y | N |
| Earthed by vehicle | Y | N | N | N |
| At control voltage | N | Y | Y | N |
| At traction voltage | N | Y | Y | N |
| Traction current made | N | Y | Y | N |

When power supply rubbing member 80 leaves segment N, FIG. 9*e*:

| Segment | N − 1 | N | N + 1 | N + 2 |
|---|---|---|---|---|
| Protected by vehicle | Y | Y | Y | N |
| Earthed by vehicle | Y | N | N | N |
| At control voltage | N | Y | Y | N |
| At traction voltage | N | Y | Y | N |
| Traction current made | N | N | Y | N |

When rear control rubbing member 90 leaves segment N, FIG. 9*f*:

| Segment | N − 1 | N | N + 1 | N + 2 |
|---|---|---|---|---|
| Protected by vehicle | Y | Y | Y | N |
| Earthed by vehicle | Y | N | N | N |
| At control voltage | N | N | Y | N |
| At traction voltage | N | N | Y | N |
| Traction current made | N | N | Y | N |

When rear earthing rubbing member 85 reaches segment N, FIG. 9*g*:

| Segment | N − 1 | N | N + 1 | N + 2 |
|---|---|---|---|---|
| Protected by vehicle | Y | Y | Y | N |
| Earthed by vehicle | N | Y | N | N |
| At control voltage | N | N | Y | N |
| At traction voltage | N | N | Y | N |
| Traction current made | N | N | Y | N |

When the rear of vehicle 5 reaches segment N, FIG. 9*h*:

| Segment | N − 1 | N | N + 1 | N + 2 |
|---|---|---|---|---|
| Protected by vehicle | N | Y | Y | N |
| Earthed by vehicle | N | Y | N | N |
| At control voltage | N | N | Y | N |
| At traction voltage | N | N | Y | N |
| #raction current made | N | N | Y | N |

Of course, the invention is not limited to the embodiments that have just been described but encompasses any embodiment within the spirit of the invention.

Accordingly, a device for vehicles steered by a driver is within the scope of the invention. A device of this kind has tracks of sufficient width to enable lateral excursions of the vehicle without breaking contact between the vehicle and the tracks.

Power supply segments of non-constant length are also within the scope of the invention, in particular segments of reduced length at the exit from an originating station of the vehicle, in order to bring about relatively frequent switching even when the vehicle is traveling at low speed to prevent overheating of the thyristors.

The thyristors of the devices described can be replaced by transistors or any other type of semiconductor switch.

What is claimed is:

1. A ground power supply device for an electrical vehicle having a given footprint (5) including a power supply track (50) made up of segments (52), the segments being separated from each other by insulative joints (54) and each having a length less than half the length of the footprint of the vehicle (5) and a switching device (200) adapted to apply a supply voltage to anyone of the segments (52) only when said anyone of the segments (52) is within the footprint of the vehicle (5) having power supply rubbing member means (80, 81, 82) the extent of which is greater than the length of the insulative joints (54) so that the rubbing means (80, 81, 82) are adapted to contact simultaneously two adjacent segments, and the switching device (200) being adapted to apply the supply voltage to the two adjacent segments (52) which are in simultaneous contact with the rubbing member means and to earth one of those two segments (52) before this segment begins to get out the footprint of the vehicle wherein the device includes, for each segment (52), a controlled component (TH3) adapted to link the segment to earth, and the device includes means (360) to inject a current in the earthing component (TH3), as well as means (RL2, C3, 600) to cut-off the segment (52) relative to a source of said supply voltage, which cut-off means are controlled by the injected current so as to cut-off the segment (52) when the injected current is jammed despite the earthing component being controlled to a jamming state.

2. A device according to claim 1, characterized in that the vehicle (5) carries a control device (7, 90, 91, 92, 93, 94, 95) adapted to energize any segment (52) at least a part of which is in an activation area (90, 91, 92, 93, 94, 95) whose ends (90, 91, 92, 93, 94, 95) are on respective opposite sides of and beyond front and rear edges of the rubbing member means (80, 81, 82) of the vehicle (5).

3. A device according to claim 2, characterized in that the distance between the front end (91, 93, 95) of said activation area (90, 91, 92, 93, 94, 95) and the front edge of the power supply rubbing member means (80, 81, 82) is greater than the product of the maximum speed (V) of the vehicle (5) and a maximum segment switching time.

4. A device according to claim 3, characterized in that the control device (7, 90, 91) comprises two presence signal generators (90, 91, 92, 93, 94, 95) which define said ends of said activation area (90, 91, 92, 93, 94, 95).

5. A device according to claim 4, characterized in that the device includes a control receiving track (60) made up of insulated segments (63) having the same lengths and the same locations as the segments (52) of the power supply track (50) and in that the signal generators (90, 91, 92, 93, 94, 95) comprise two rubbing members (92, 93, 94, 95) connected to a voltage generator (7, 8) on board the vehicle (5) in contact over a limited distance with said control track (60).

6. A device according to claim 5, characterized in that the control receiving track (60) and the power supply track (50) are combined and in that the voltage generator (8) generates an AC voltage (8) superimposed on a supply voltage.

7. A device according to claim 1, characterized in that the control device (7, 90, 91) has at least one current loop (90, 91) on board the vehicle (5) and in that the device includes a set of current loops (62) disposed successively along the power supply track (50) and each loop adapted to transmit an electrical control signal when a magnetic field passes through the considered loop, the onboard loop (90, 91) and the loops (62) disposed along the track (50) being adapted to produce local magnetic coupling when the onboard loop (90, 91) is in line with one of the loops (62) disposed along the track.

8. A device according to claim 7, characterized in that the loops (62) have the same lengths and the same locations as the segments (52) of the power supply track (50) and in that the vehicle (5) carries two onboard current loops (90, 91) disposed on respective opposite sides of and beyond front and rear edges of the rubbing member means (80, 81, 82) which define said ends of said activation area (90, 91, 92, 93, 94, 95).

9. A device according to claim 2, characterized in that it includes a current return track (10) and in that the vehicle (5) carries a safety rubbing member (85) in contact with the power supply track (50) and connected directly to the current return track (10) disposed to the rear of the rear end (90, 92, 94) of said activation area (90, 91, 92, 93, 94, 95) at a distance from that end (90, 92, 94) greater than the length of a power supply segment (52) plus the product of the maximum speed (V) of the vehicle (5) and a maximum switching time ($T_c$) of the segment (52).

10. A device according to claim 2, characterized in that the vehicle (5) carries a return rubbing member (85) for the power supply current from the motor of the vehicle (5), the rubbing member (85) being in contact with the power supply track (50) and disposed ahead of the front end (91, 93, 95) of the activation area (90, 91, 92, 93, 94, 95) at a distance from that end greater than the length of a power supply segment (52).

11. A device according to claim 2, characterized in that the vehicle (5) carries a return rubbing member (85) for the power supply current from the motor of the vehicle (5), the rubbing member (85) being in contact with the power supply track (50) and disposed to the rear of the rear end (90, 92, 94) of said activation area (90, 91, 92, 93, 94, 95) at a distance from that end (90, 92, 94) greater than the length of a power supply segment (52) plus the product of the maximum speed (V) of the vehicle (5) and a maximum switching time ($T_c$) of a power supply segment (52).

12. A device according to claim 1, characterized in that the device comprises a switching module (500) for each power supply segment (52) which receives an input voltage when a control segment (63) or a control loop (62) corresponding to a power supply segment (52) receives a signal indicating presence of the vehicle (5).

13. A device according to claim 12, characterized in that the switching module (500) is adapted to connect the corresponding power supply segment (52) selectively to earth or to a permanent voltage source (300).

14. A device according to claim 13, characterized in that each switching module (500) includes a semiconductor power supply switching device (TH1) conducting in the direction from the permanent voltage source (300) to the power supply segment (52) and a control input of which is connected to a permanent low-voltage source (350) via a first switch (C1) controlled by a main relay (RL1) energized by said input voltage.

15. A device according to claim 14, characterized in that each switching module (500) includes a braking current semiconductor switching device (TH2) conducting in the direction from the power supply segment (52) to the permanent voltage source (300) and a control input of which is connected to said permanent low-voltage source (350) via said first switch (C1).

16. A device according to claim 14, characterized in that the switching module (500) includes an earthing semiconductor switching device (TH3) conducting in the direction from the power supply segment (52) to earth and a control input of which is connected to said permanent low-voltage source (350) via a second switch (C0) controlled by said main relay (RL1).

17. A device according to claim 14, characterized in that the switching module (500) includes a pilot wire (600) which when cut trips out said permanent voltage source (300) and in that the pilot wire (600) includes in parallel:

a first pilot wire switch(C4) controlled by a secondary relay (RL2) connected to said permanent low-voltage source (350) via a third switch (C2) controlled by the main relay (RL1) and connected to the power supply segment (52) via a diode conducting in the direction towards the power supply segment (52), the first switch (C4) of the pilot wire (600) being closed when the secondary relay (RL2) is not energized, and a second pilot wire switch (C3) controlled by the main relay (RL1) and closed when the main relay (RL1) is energized.

18. A device according to claim 17, characterized in that a fuse (F) is connected in series with the diode (D3) of the secondary relay.

19. A device according to claim 14, characterized in that when the main relay (RL1) is energized:

the first switch (C1) is closed;

the second switch (C0) is open;

the third switch (C2) is open; and the second pilot wire switch (C3) is closed.

20. The device of claim 1, wherein the cut-off means include a pilot wire (600) which when cut strips out said supply voltage source (300) and a relay (RL2) which controls the opening and closing of a first switch (C4) placed on the pilot wire, this relay (RL2) being placed so as to be crossed and controlled by a current which corresponds to said injected current.

21. The device of claim 20, wherein this device includes a switching module (500) for each supply segments (52), which receives an input voltage when a segment (63) or a control loop (62) corresponding to this power supply segment (52) receives a signal indicating the presence of the vehicle (5), and wherein the switching module (500) includes a main relay (RL1) controlled by said input voltage, which main relay (RL1) controls a switch of the pilot wire, this switch being placed in parallel to said first switch (C4).

22. The device of claim 21, wherein the relay (RL2) which is placed so as to be crossed by said current corresponding to the current which is injected in the earthing component (TH3) is placed in series with a switch which is controlled by said main relay (RL1).

* * * * *

UNITED STATES PATENT AND TRADEMARK OFFICE
CERTIFICATE OF CORRECTION

PATENT NO. : 6,250,442 B1
DATED : June 26, 2001
INVENTOR(S) : Olivier Perraud, Stephane Brunet and Bruno Morin It is certified that error appears in the above-identified patent and that said Letters Patent is hereby corrected as shown below:

Column 17,
Line 1, before "having a length" insert -- of the segments --
Line 5, before "having power supply" insert -- , the vehicle --
Line 12, delete "one of those two" and insert -- a first one of the adjacent --
Line 22, delete "a jamming" and insert -- an earthing --

Signed and Sealed this

Ninth Day of July, 2002

*Attest:*

JAMES E. ROGAN
*Director of the United States Patent and Trademark Office*

*Attesting Officer*